Patented June 25, 1935

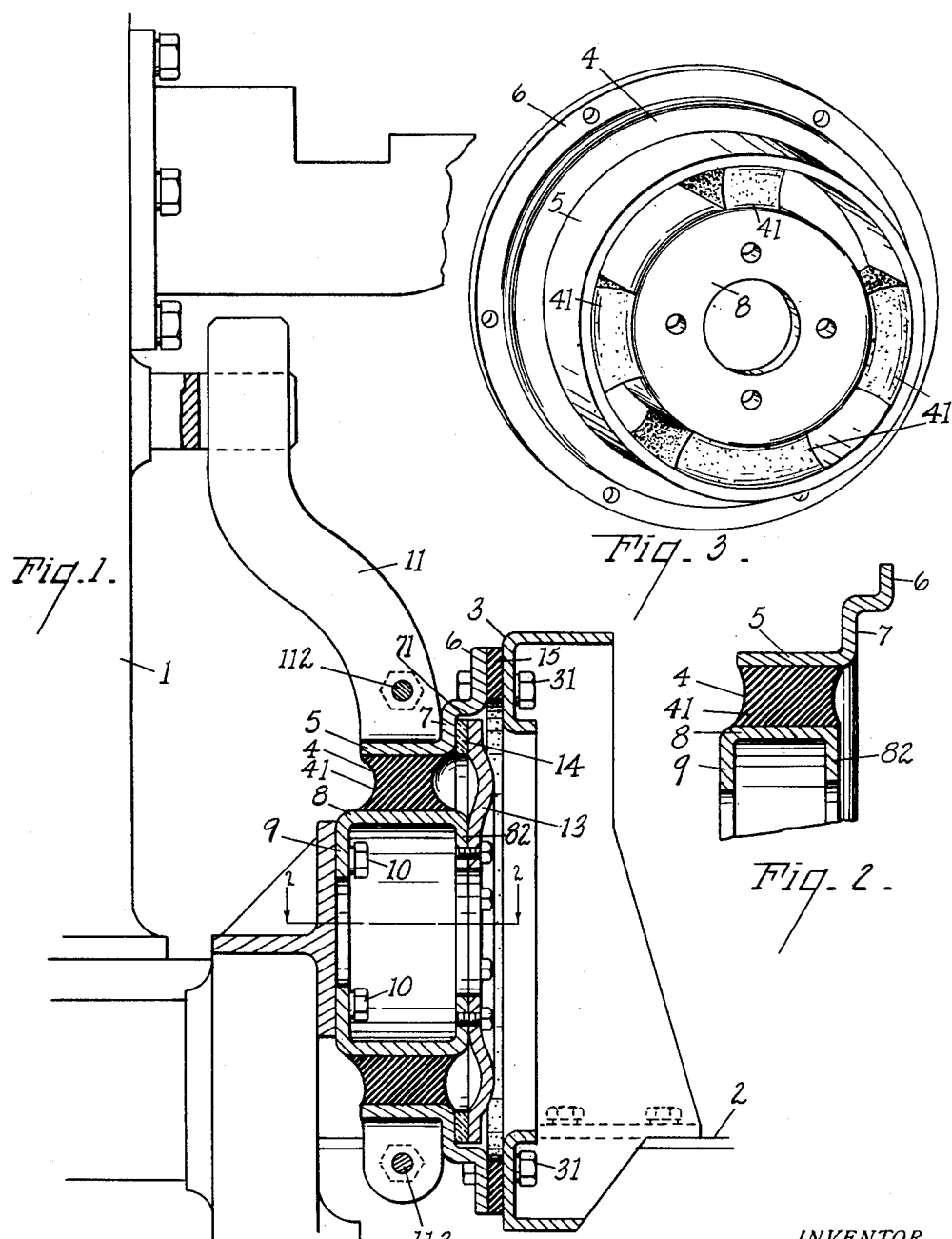

2,005,934

UNITED STATES PATENT OFFICE 2,005,934

ELASTIC CUSHION MOUNTING

Andrew G. Carter, Grand Rapids, Mich.

Application December 29, 1932, Serial No. 649,290

4 Claims. (Cl. 248—7)

This invention relates to improvements in elastic or cushion mountings for automobile motors or similar bodies, although the invention is adapted to other uses.

The objects of the invention are:

First, to provide an improved cushion construction comprising a union of metal reinforcing with vulcanized rubber cushion in which the parts are substantially inseparably incorporated together.

Second, to provide an improved construction of metal reinforcing for rubber cushion mountings.

Third, to provide a construction of elastic cushion mounting in which the vibration of the engine or moving part is substantially controlled.

Fourth, to provide such a construction in which the rubber cushion element can be so distributed, formed and disposed as to secure any degree of rigidity or elasticity required and to locate the rigidity and the flexibility at desired and required points.

Fifth, to provide a construction of cushion mounting in which the cushion is effectively bonded directly to the metal for the utilization of the metal reinforcing means.

Objects pertaining to details and economies will appear from the description to follow. Preferred embodiments of my invention are illustrated in the accompanying drawing, in which:

Fig. 1 is an enlarged detail view in vertical central section of a structure which embodies the cushion, the stabilizing spring, and the friction means in a single structure, required for the most complete effectiveness and especially for heavy work.

Fig. 2 is a detail cross sectional view on the quarter taken on line 2—2 of Fig. 1, showing the variation of cross section of the cushion at different points in its circumference, the cushion being varied by the extent of the concavity in the face or faces of the cushion.

Fig. 3 is a detail perspective view of a modified construction in which segments of rubber cushion are made use of in place of complete rings, the extent and cross section of the cushion segments being varied to meet requirements.

The parts will be identified by their numerals of reference.

1 is an automobile motor casing shown conventionally. 2 is the frame or chassis, being also shown conventionally. 3 is a supporting bracket for the cushion mounting, being apertured for the crank shaft, as seen in Fig. 1, where the structure is illustrated for a front mounting. The bracket may be of any height required for the service and character of mounting in which it is used.

4 is my improved cushion member as an entirety, having incorporated as its yielding member a rubber cushion 41. It comprises an outer metallic annular portion 5 which is provided with an outwardly projecting flange 6 by which it is connected to the bracket 3 by means of bolts 31. Incidentally it frequently happens that the flange 6 may be bolted directly to the cross member of the frame.

8 is the inner reinforcing metallic supporting member provided with inwardly projecting flange 9 which is perforated for attachment to the engine casing by cap screws 10. Stud bolts are, of course, available for this purpose.

The rubber cushion center or member 41 is especially formed in cross section at different points for the duty required. This is securely bonded to the said reinforcing supports. At the bottom, as seen in Fig. 3, it entirely fills the space between the reinforcing rings and it carries the greater proportion of the load at that point and is subjected to compression. At the top the amount of rubber is very materially reduced as seen in Fig. 3, to permit of elasticity on the upward movement of the engine and to thus effectively cushion the parts. It supports by tension in the normal position. As seen in Fig. 3, an intermediate amount of cushion is disposed at the sides to offer effective resistance to the lateral variations. The variation of cross section of the rubber at various points allows the complete variation of flexibility to meet all requirements.

For light duty the structure, as illustrated as the front suspension in Fig. 1, is sufficient. By increasing the cross section and adding to the resistance, it will serve for heavy duty as well. However, the structure can be supplemented and stabilized by the stabilizing spring 11, as seen in Figs. 5 and 6. The spring 11 is made of symmetrical halves 111 encircling the cushion and being joined by cross bolts 112 and 113, one side only being shown, the sides being symmetrical. The upper end engages a bifurcated or slotted bracket 12 or any suitable means.

It will be readily understood that the elasticity of the spring 11, when thus clamped to the outer rigid member 5 as carried by the frame or frame bracket, supports the same so that in the event of vibration of the engine or motor from side to side, it is resisted by this spring which tends to return the same to the center and minimize the vibration. This is especially of advantage in the starting of the engine as it resists the torque and quickly stabilizes and minimizes the same.

I have shown this spring in vertical position. It can be pointed in any direction so long as it couples the fixed part of the cushion device to the vibrating part or motor and will be disposed to accommodate the parts, depending on the elevation and position of the connection.

Further, where there is very heavy duty or where for any reason it is desired to give additional resistance to the vibration, I secure to an inwardly projecting flange 82 on the member 8 annular spring disk 13 carrying on its inner face an annular friction member 14 which is forced into contact with the flange 7 to resist the relative rotation between these parts. The flange 7 is recessed at 71 to accommodate this friction member. I insert an insulating cushion 15 between the flange 7 and its support in this modification.

Having thus described my invention, what I claim as new and desire to secure by Letters Patent is:

1. In an elastic cushion mounting for a motor, the combination of an outer rigid member, an inner rigid member embraced by said outer member in spaced relation thereto, a resilient rubber cushion disposed between said rigid members and bonded thereto to connect and unite the same and support and hold a motor and insulate from vibrations of such a motor, said cushion being proportioned so that its greatest cross section is at the bottom portion and its smallest cross section at the top portion with the cross section of its side portions of intermediate size, whereby the side portions being of smaller size will transmit less vibration while, in their relation to the other portions, they will supply sufficient resistance to a lateral vibration of a motor in the mounting, and whereby the top portion being of smaller cross section will transmit less vibration while, in its relation to the other portions, it will supply sufficient resistance to upward movement of a motor in the mounting whereby the motor is supported with sufficient rigidity and with a minimum of transmission of vibration through the mounting.

2. In an elastic cushion mounting for a motor, the combination of an outer rigid member, an inner rigid member embraced by said outer member in spaced relation thereto, a resilient cushion disposed between said rigid members and bonded thereto to connect and unite the same and support and hold a motor and insulate from vibrations of such a motor, said cushion being proportioned so that its greatest cross section is at the bottom portion and its smallest cross section at the top portion with the cross section of its side portions of intermediate size, whereby the side portions being of smaller size will transmit less vibration while, in their relation to the other portions, they will supply sufficient resistance to a lateral vibration of a motor in the mounting, and whereby the top portion being of smaller cross section will transmit less vibration while, in its relation to the other portions, it will supply sufficient resistance to upward movement of a motor in the mounting whereby the motor is supported with sufficient rigidity and with a minimum of transmission of vibration through the mounting.

3. In an elastic cushion mounting for a motor, the combination of an outer rigid member, an inner rigid member embraced by said outer member in spaced relation thereto, a resilient rubber cushion disposed between said rigid members and bonded thereto to connect and unite the same and support and hold a motor and insulate from vibrations of such a motor, said cushion being proportioned with its bottom portion of largest size and its top portion of smallest size and with its side portions of intermediate size, whereby the side portions being of smaller size will transmit less vibration while, in their relation to the other portions, they will supply sufficient resistance to a lateral vibration of a motor in the mounting, and whereby the top portion being of smaller size will transmit less vibration while, in its relation to the other portions, it will supply sufficient resistance to upward movement of a motor in the mounting whereby the motor is supported with sufficient rigidity and with a minimum of transmission of vibration through the mounting.

4. In an elastic cushion mounting for a motor, the combination of an outer rigid member, an inner rigid member embraced by said outer member in spaced relation thereto, a resilient rubber cushion disposed between said rigid members and bonded thereto to connect and unite the same and support and hold a motor and insulate from vibrations of such a motor, said cushion being so proportioned that its side and top portions are of smaller size than the bottom portion but are of sufficient size to resist motion while being small enough to transmit the minimum vibration whereby the motor is supported with sufficient rigidity and with a minimum of transmission of vibration through the mounting.

ANDREW G. CARTER.